US010470147B2

(12) United States Patent
Chae et al.

(10) Patent No.: US 10,470,147 B2
(45) Date of Patent: Nov. 5, 2019

(54) METHOD FOR EXECUTING RSTD MEASUREMENT-RELATED OPERATION IN WIRELESS COMMUNICATION SYSTEM

(71) Applicant: LG ELECTRONICS INC., Seoul (KR)

(72) Inventors: Hyukjin Chae, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

(21) Appl. No.: 15/562,272

(22) PCT Filed: Apr. 1, 2016

(86) PCT No.: PCT/KR2016/003398
§ 371 (c)(1),
(2) Date: Sep. 27, 2017

(87) PCT Pub. No.: WO2016/159713
PCT Pub. Date: Oct. 6, 2016

(65) Prior Publication Data
US 2019/0069260 A1    Feb. 28, 2019

Related U.S. Application Data

(60) Provisional application No. 62/141,839, filed on Apr. 1, 2015, provisional application No. 62/146,195, filed (Continued)

(51) Int. Cl.
*H04W 56/00* (2009.01)
*H04W 24/10* (2009.01)
(Continued)

(52) U.S. Cl.
CPC ....... *H04W 56/0075* (2013.01); *H04W 24/10* (2013.01); *H04W 56/006* (2013.01); *H04W 64/00* (2013.01); *H04W 92/18* (2013.01)

(58) Field of Classification Search
CPC .......... H04W 56/0075; H04W 56/006; H04W 64/00; H04W 24/10; H04W 92/18
See application file for complete search history.

(56) References Cited

U.S. PATENT DOCUMENTS

2012/0302254 A1\*  11/2012  Charbit ................... H04W 4/70
                                                                          455/456.1
2013/0260793 A1    10/2013  Lim et al.
(Continued)

FOREIGN PATENT DOCUMENTS

WO    WO 2014/106976 A1    7/2014

OTHER PUBLICATIONS

Institute for Information Industry (III), "Indoor positioning based on enhanced UTDOA," R1-150419, 3GPP TSG RAN WG1 Meeting #80, Athens, Greece, Feb. 9-13, 2015, pp. 1-7.
(Continued)

Primary Examiner — Ian N Moore
Assistant Examiner — Rushil Parimal Sampat
(74) Attorney, Agent, or Firm — Birch, Stewart, Kolasch & Birch, LLP

(57) ABSTRACT

An embodiment of the present invention relates to a method for executing a reference signal time difference measurement (RSTD) measurement-related operation by a terminal in a wireless communication system, which is a measurement-related operation executing method comprising the steps of: receiving RSTD measurement information from two or more helper UEs (H-UEs); using the received RSTD measurement information to correct the RSTD measurement information measured by the terminal; and transmitting the corrected RSTD measurement information to a base station.

9 Claims, 15 Drawing Sheets

Related U.S. Application Data on Apr. 10, 2015, provisional application No. 62/150,854, filed on Apr. 22, 2015.

(51) Int. Cl.
*H04W 64/00* (2009.01)
*H04W 92/18* (2009.01)

(56) References Cited

U.S. PATENT DOCUMENTS

2016/0142898 A1* 5/2016 Poitau .................. H04W 76/14
    370/329
2016/0195601 A1* 7/2016 Siomina ................ G01S 5/0205
    455/456.1

OTHER PUBLICATIONS

Intel Corporation, "Discussion on Potential Enhancement of Positioning Techniques," R1-150243, 3GPP TSG-RAN WG1 #80, Athens, Greece, Feb. 9-13, 2015, pp. 1-5.
LG Electronics, "Discussion on potential enhancements for indoor positioning," R1-150229, 3GPP TSG RAN WG1 Meeting #80, Athens, Greece, Feb. 9-13, 2015, pp. 1-4.

\* cited by examiner

FIG. 5
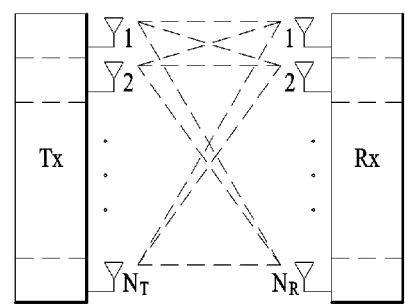
(a)
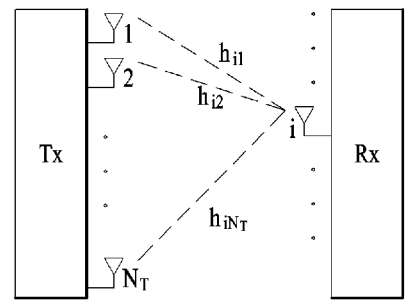
(b)

FIG. 8
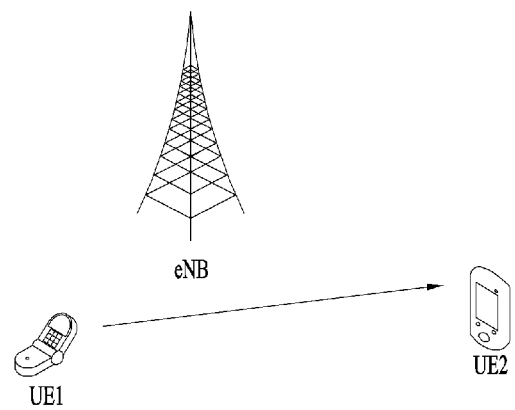
(a)
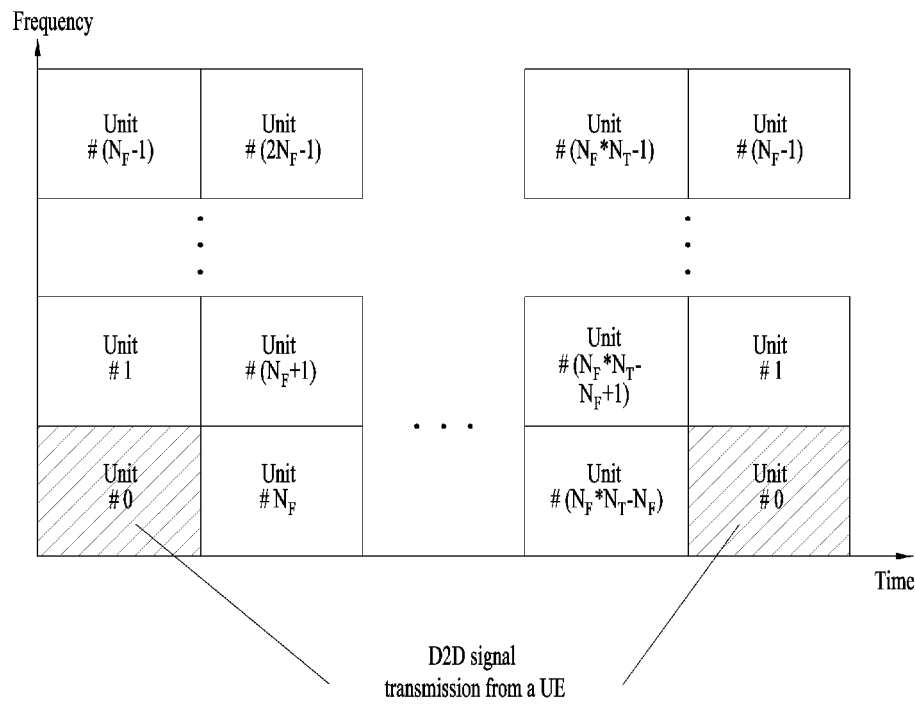
(b)

METHOD FOR EXECUTING RSTD MEASUREMENT-RELATED OPERATION IN WIRELESS COMMUNICATION SYSTEM

CROSS REFERENCE TO RELATED APPLICATIONS:

This application is the National Phase of PCT International Application No. PCT/KR2016/003398, filed on Apr. 1, 2016, which claims priority under 35 U.S.C. 119(e) to U.S. Provisional Application No. 62/141,839, filed on Apr. 1, 2015, No. 62/146,195, filed on Apr. 10, 2015 and No. 62/150,854, filed on Apr. 22, 2015, all of which are hereby expressly incorporated by reference into the present application.

TECHNICAL FIELD

The following description relates to a wireless communication system and, more particularly, to a method and device for performing reference signal time difference (RSTD) measurement-related operation of a user equipment (UE).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE

Technical Problem

An object of the present invention is to provide a method of sharing a reference signal time difference (RSTD) between UEs to increase RSTD estimation accuracy in order to improve location estimation performance in an observed time difference of arrival (OTDOA) method of estimating the location of a UE.

The technical problems solved by the present invention are not limited to the above technical problems and other technical problems which are not described herein will become apparent to those skilled in the art from the following description.

Technical Solution

The object of the present invention can be achieved by providing a method of, at a user equipment (UE), performing reference signal time difference (RSTD) measurement-related operation in a wireless communication system including receiving RSTD measurement information from two or more H-UEs(helper UEs), correcting RSTD measurement information measured by the UE using the received RSTD measurement information, and transmitting the corrected RSTD measurement information to a base station.

In another aspect of the present invention, provided herein is a user equipment (UE) device for performing reference signal time difference (RSTD) measurement-related operation in a wireless communication system including a transmission module and a reception module and a processor, wherein the processor receives RSTD measurement information from two or more H-UEs(helper UEs), corrects RSTD measurement information measured by the UE using the received RSTD measurement information, and transmits the corrected RSTD measurement information to a base station.

The correcting of the RSTD measurement information may be performed using a linear combination of the RSTD measurement information measured by the UE and the received RSTD measurement information.

The correcting of the RSTD measurement information may be performed using a weighted average of the RSTD measurement information measured by the UE and the received RSTD measurement information.

Upon obtaining the weighted average, a weighted factor of an i-th UE may be sqrt(RSTD quality_i)/sum(sqrt(RSTD quality_i)).

The correcting of the RSTD measurement information may be performed using only vertical location information of the RSTD measurement information from the H-UEs.

The UE may receive STD measurement information from the H-UEs through a discovery signal.

The H-UEs may be selected by the UE from among PH-UEs(potential helper UEs) discovered in a D2D discovery process.

The H-UEs may have signal strengths equal to or greater than a predetermined level among PH-UEs discovered in the D2D discovery process.

The H-UEs may be located at distances of a predetermined value or less among PH-UEs discovered in the D2D discovery process.

The H-UEs may be selected by a network from among PH-UEs(potential helper UEs) based on D2D discovery information reported by the UE.

The H-UEs may be UEs whose expected RSTD uncertainty is a predetermined value or less among PH-UEs.

Advantageous Effects

According to the present invention, it is possible to increase OTDOA measurement accuracy.

The effects which can be obtained by the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for a configuration of a wireless communication system having multiple antennas;

FIG. 8 is a diagram for an example of a D2D resource pool for performing D2D communication;

BEST MODE

Figure 1:
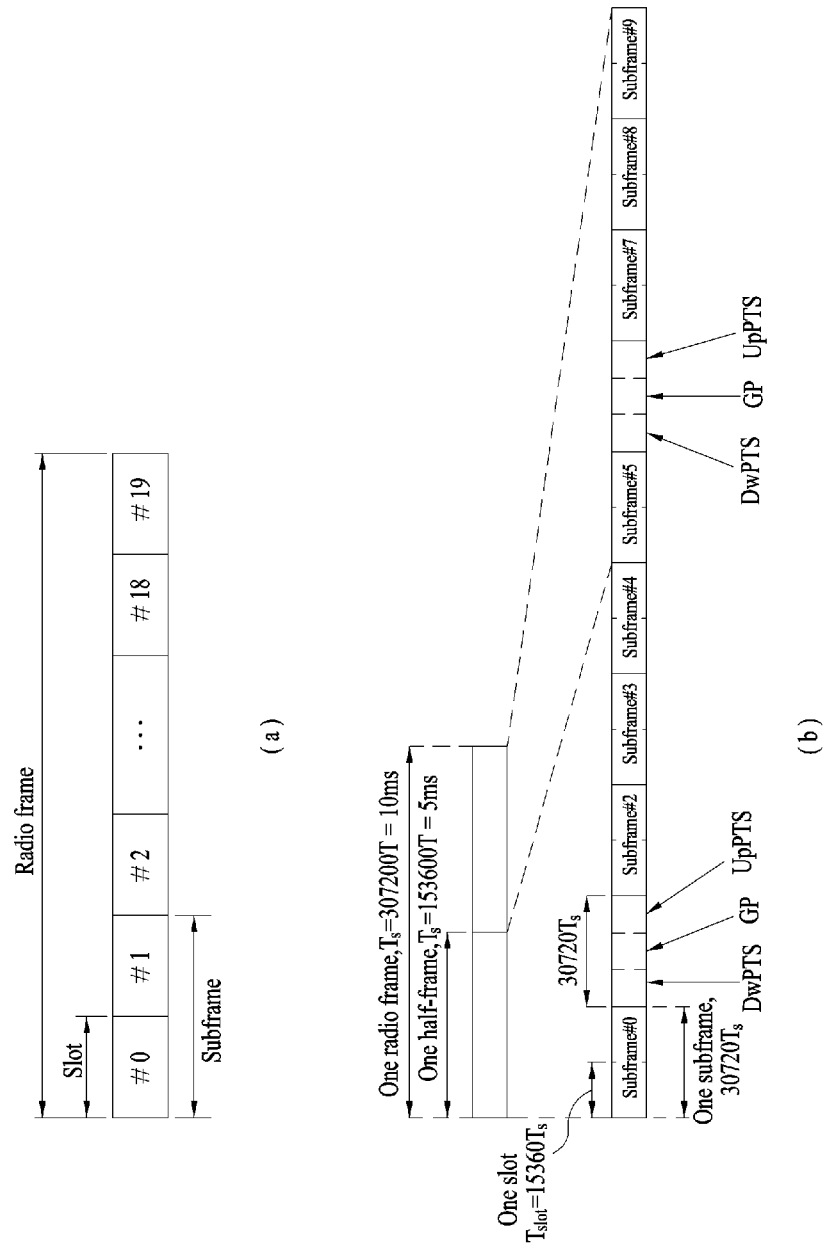
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A resource structure/channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
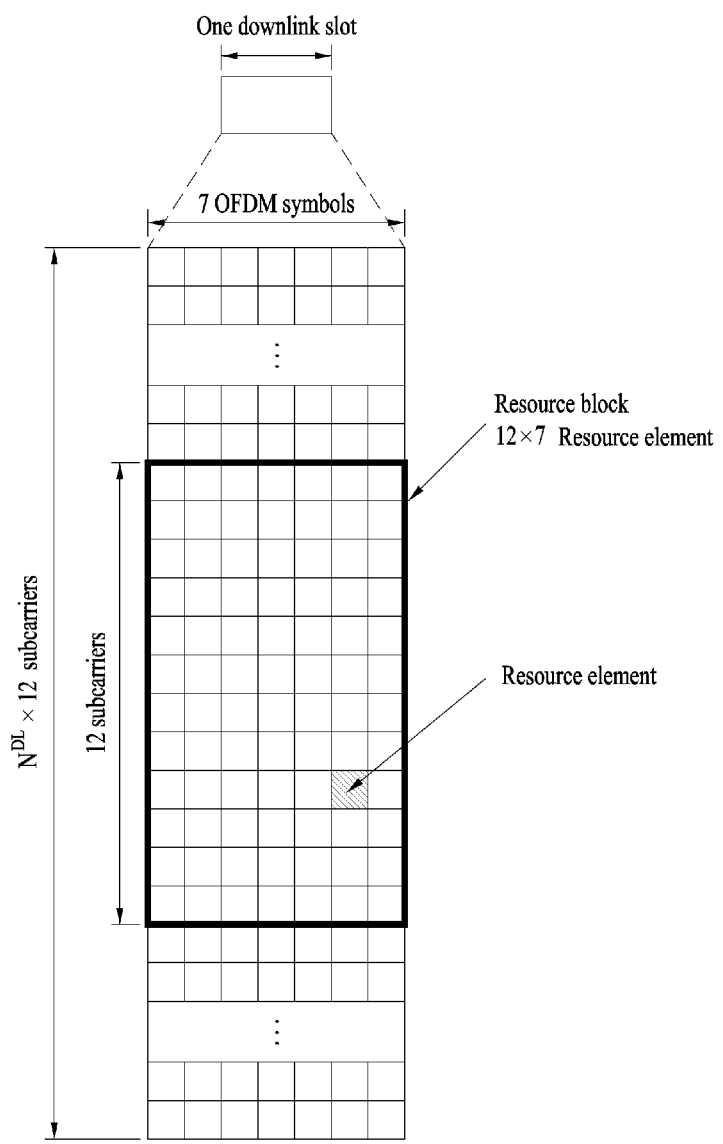
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
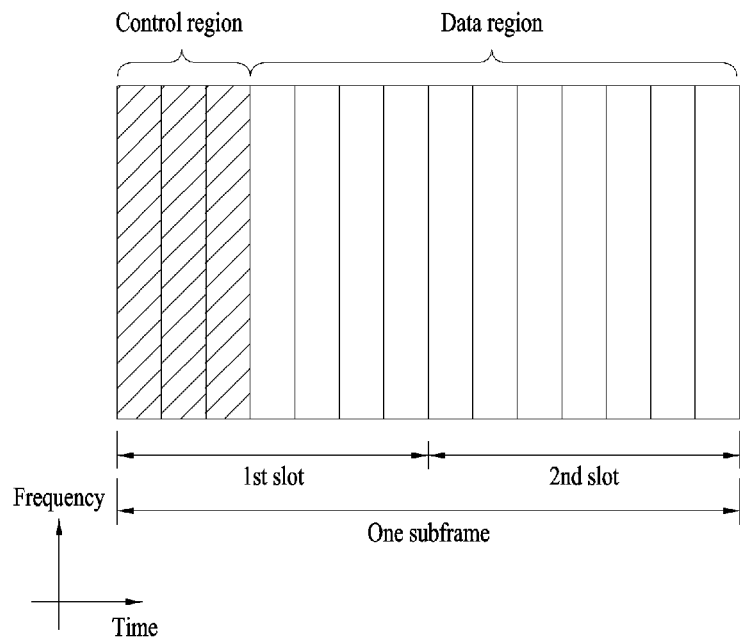
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
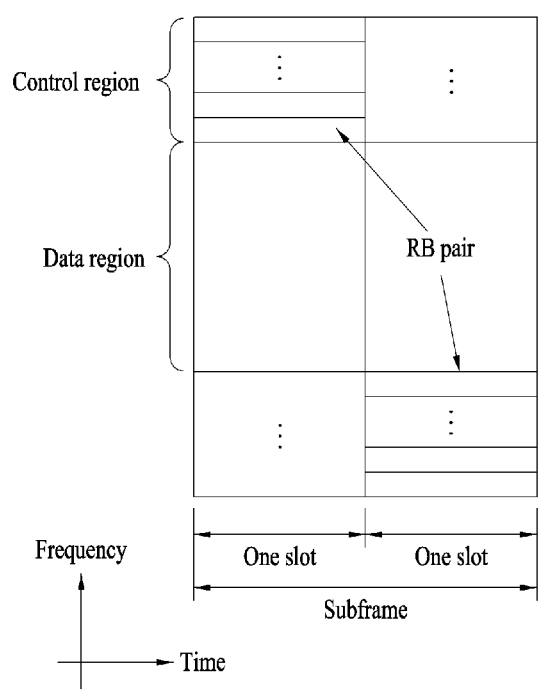
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R)$$ [Equation 1]

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T$$ [Equation 1]

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T$$ [Equation 3]

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps$$ [Equation 4]

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$ [Equation 5]

$$W\hat{s} = WPs$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T$$ [Equation 6]

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \quad \text{[Equation 8]}$$

An AWGN (Additive White Gaussian Noise) is added to the actual channels after a channel matrix H. The AWGN $n_1$, $n_2$, ..., $n_{N_R}$ respectively added to the NR receive antennas can be expressed as follows.

$$n = [n_1, n_2, \ldots, n_{N_R}]^T \quad \text{[Equation 6]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
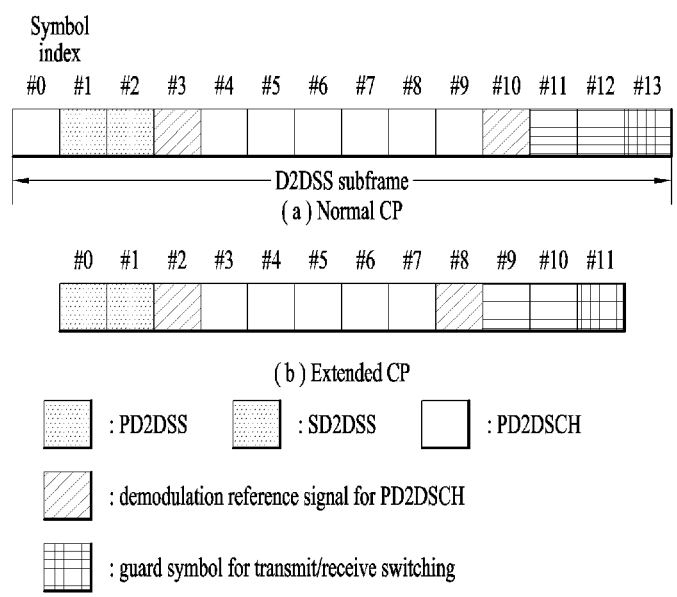
FIG. 6 is a diagram for a subframe in which a D2D synchronization signal is transmitted.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
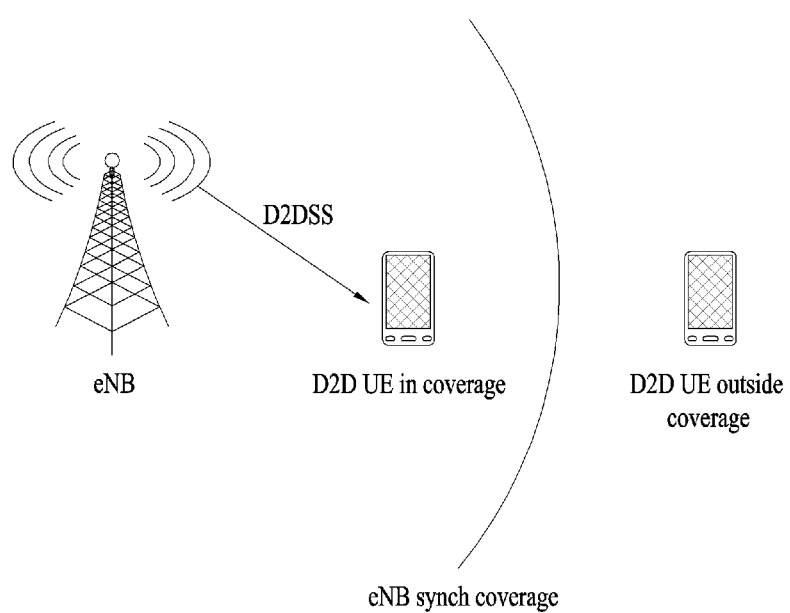
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

FIG. 8 shows an example of a UE1, a UE2 and a resource pool used by the UE1 and the UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
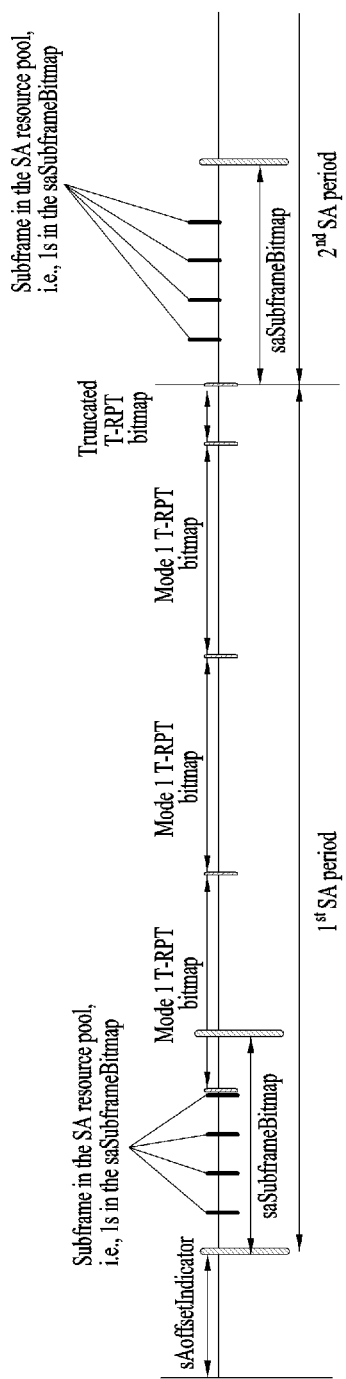
FIG. 9 is a diagram for explaining an SA period.
Figure 10:
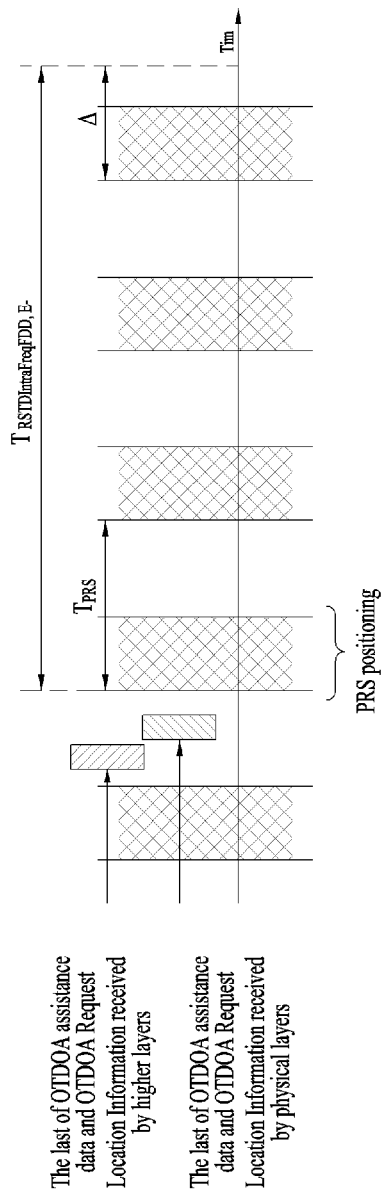
FIG. 10 is a diagram illustrating observed time difference of arrival (OTDOA)
Figure 11:
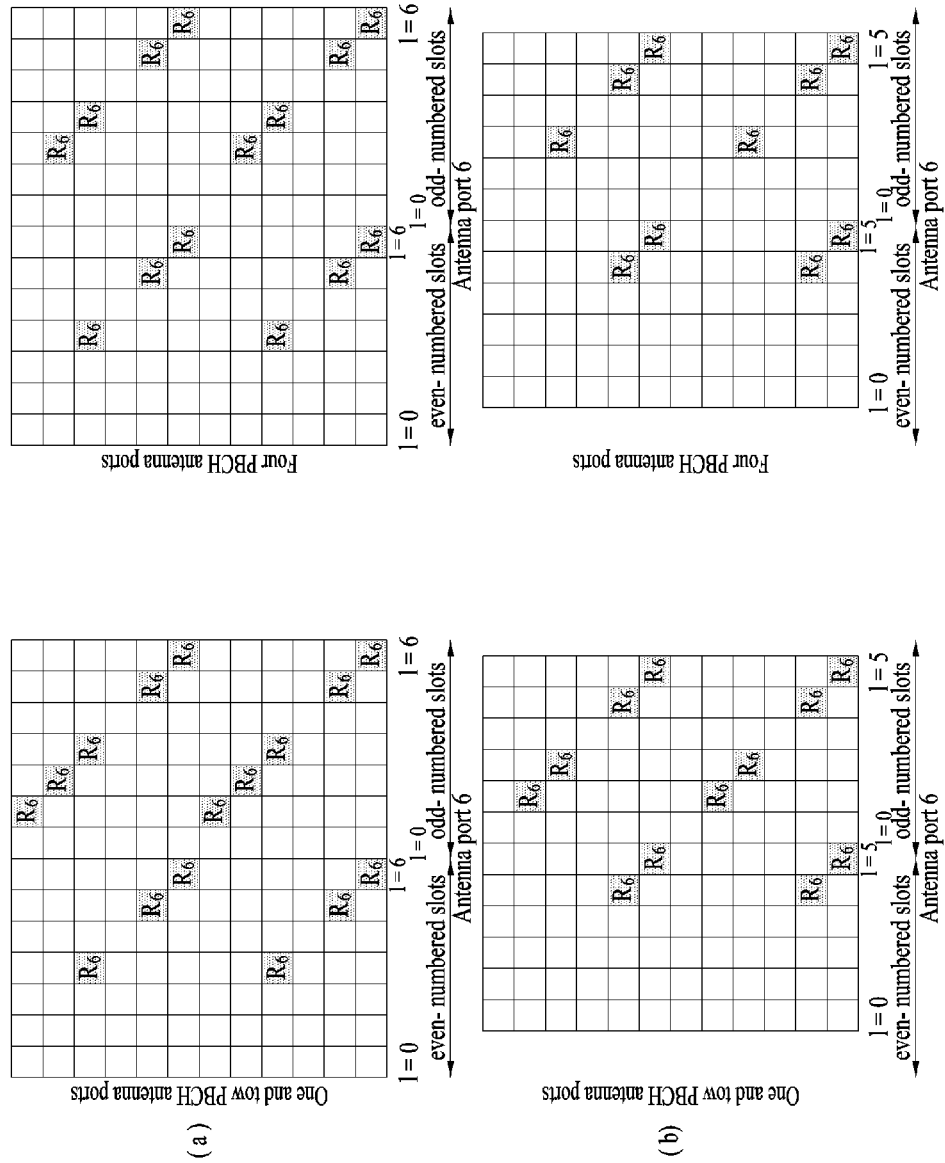
FIGS. 11 to 12 are diagrams illustrating a PRS.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes.

UE Location Information

In general, in order for a network to obtain location information of a UE, various methods are used in a cellular communication system. As a representative method, a UE receives PRS (positioning reference signal) transmission-related configuration information of a base station from a higher layer signal and measures PRSs transmitted by cells adjacent to the UE to calculate location-related information of the UE using a positioning scheme such as OTDOA (observed time difference of arrival) and forwards the calculated information to the network. Besides, an assisted global navigation satellite system (A-GNSS) positioning scheme, enhanced cell-ID (E-CID) techniques, uplink time difference of arrival (UTDOA), and the like exist. The abovementioned positioning schemes can be utilized for various location-based services (e.g., advertising, location tracking, emergency communication means, etc.).

OTDOA (Observed Time Difference Of Arrival)

The OTDOA method provides a UE with information on a reference cell and a neighboring cell and makes the UE measure and report a relative time difference between the reference cell and the neighboring cell via a specific signal (e.g., a PRS) to estimate a location of the UE based on the time difference.

In the case of FDD, intra-frequency (when a PRS is transmitted at the same frequency as a serving cell) OTDOA measurement will now be described.

If OTDOA assistance data and a physical cell ID of a neighboring cell are provided, a UE may detect an intra-frequency PRS and measure a reference signal time difference (RSTD) during a total time for detection and measurement. The total time for detection and measurement is shown in Equation 12 below.

$$T_{RSTD\ IntraFreqFDD,\ E\text{-}UTRAN} = T_{PRS} \cdot (M-1) + \Delta MS \quad \text{[Equation 12]}$$

$T_{RSTD\ IntraFreqDD,\ E\text{-}UTRAN}$ corresponds to the total time for performing detection and measurement in at least n number of cells. $T_{PRS}$ corresponds to a cell-specific positioning subframe configuration period. $T_{PRS}$ corresponds to the number of PRS positioning occasions and each of the PRS positioning occasions corresponds to contiguous downlink positioning subframes of $N_{PRS}(1 \le N_{PRS} \le 6)$. The PRS positioning occasions can be defined as Table 1 in the following.

TABLE 1

| Positioning subframe configuration | Number of PRS positioning occasions M | |
| --- | --- | --- |
| period $T_{PRS}$ | f1 | f1 and f2 |
| 160 ms | 16 | 32 |
| >160 ms | 8 | 16 |

When only intra-frequency RSTD measurements are performed over cells belonging to the serving FDD carrier frequency f1.
When intra-frequency RSTD and inter-frequency RSTD measurements are performed over cells belonging to the serving FDD carrier frequency f1 and one inter-frequency carrier frequency f2, respectively.

And, $$\Delta = 160 \cdot \left\lceil \frac{n}{M} \right\rceil$$

ms corresponds to measurement time for single PRS positioning $N_{PRS}(1 \le N_{PRS} \le 6)$ including sampling time and processign time.

It is necessary for a UE physical layer to have capability capable of reporting an RSTD for a reference cell and all neighboring cells i located at the outside of at least (n-1) number of neighboring cells in the $T_{RSTD\ IntraFreqDD,\ E\text{-}UTRAN}$. For all frequency bands of the reference cell, (PRS $\hat{E}_s/\text{Iot})_{ref \ge -6}$ dB should be satisfied. For all frequency bands of the neighboring cell i, $(PRS\hat{E}_s/\text{Iot})_i \ge -13$ dB should be satisfied. PRS $\hat{E}_s/\text{Iot}$ corresponds to an average reception energy ratio per PRS RE. This ratio is measured for all REs in which a PRS is carried.

As shown in FIG. 6, $T_{RSTD\ IntraFreqFDD,\ E\text{-}UTRAN}$ starts from a first subframe of a closest PRS positioning occasion after an OTDOA assistance data belonging to OTDOA-RequestLocationInformation and OTDOA-ProvideAssistanceData is received by a physical layer of a UE.

If intra-frequency handover occurs in the middle of measuring an intra-frequency RSTD, a UE should complete an OTDOA measurement session in progress. The UE should satisfy intra-frequency OTDOA measurement and accuracy request as well. In this case, $T_{RSTD\ IntraFreqFDD,\ E\text{-}UTRAN,HO}$ can be represented as equation 13 in the following.

$$T_{RSTD\ IntraFreqFDD,\ E\text{-}UTRAN,HO} = T_{RSTDIntraFreqFDD,E\text{-}UTRAN} K \times T_{PRS} + T_{HO}\ \text{ms} \quad \text{[Equation 13]}$$

In this case, K corresponds to the number of intra-frequency handovers occurred during $T_{RSTD\ IntraFreqFDD,\ E\text{-}UTRAN,HO}$ and $T_{HO}$ corresponds to a time period incapable of performing RSTD measurement due to the intra-frequency handover. The time period may have a period up to 45 ms.

Besides, for explanation on TDD intra-frequency, FDD-FDD inter-frequency OTDOA, and TDD-FDD inter-frequency OTDOA, it may refer to 3GPP TS 36.133.

For OTDOA, a base station can transmit information on a reference cell and information on neighboring cells to a UE via OTDOA-ProvideAssistanceData shown in Table 2 in the following.

TABLE 2

```
-- ASN1START
OTDOA-ProvideAssistanceData ::= SEQUENCE {
    otdoa-ReferenceCellInfo    OTDOA-ReferenceCellInfo          OPTIONAL,   -- Need ON
    otdoa-NeighbourCellInfo    OTDOA-NeighbourCellInfoList      OPTIONAL,   -- Need ON
    otdoa-Error                OTDOA-Error                      OPTIONAL,   -- Need ON
}
-- ASN1STOP
```

In Table 2, the information (otdoa-ReferenceCellInfo) on the reference cell corresponds to an information element (IE) used by a location server to provide reference cell information for the OTDOA assistance data. The information can be represented as Table 3 in the following.

responds to an IPRS corresponding to a PRS configuration index. The numDL-Frames corresponds to $N_{PRS}$ corresponding to the number of contiguous downlink subframes having a PRS. The prs-MutingInfo corresponds to a PRS muting configuration of a cell.

TABLE 3

```
-- ASN1START
OTDOA-ReferenceCellInfo ::= SEQUENCE {
    physCellId                              INTEGER (0..503),
    cellGlobalId                            ECGI
        OPTIONAL,           -- Need ON
    earfcnRef                               ARFCN-ValueEUTRA           OPTIONAL,
                -- Cond NotSameAsServ0
    antennaPortConfig               ENUMERATED {ports1-or-2, ports4, ...}
            OPTIONAL,                       -- Cond NotSameAsServ1
    cpLength                                ENUMERATED { normal, extended, ... },
    prsInfo                                         PRS-Info
        OPTIONAL,           -- Cond PRS
    ...,
    [[ earfcnRef-v9a0    ARFCN-ValueEUTRA-v9a0        OPTIONAL
-- Cond NotSameAsServ2
    ]]
}
-- ASN1STOP
```

In Table 3, the physCellId corresponds to a physical cell ID of a reference cell and the cellGlobalId corresponds to a unique ID of the reference cell in the overall system. The earfcnRef corresponds to EARFCN of the reference cell. The antennaPortConfig indicates an antenna port to be used for a specific reference signal among antenna ports 1, 2, and 4. The cpLength corresponds to a CP length of a reference cell PRS. The prsInfo corresponds to a PRS configuration of the reference cell.

Table 4 in the following shows a prsInfo information element.

Information on a reference cell is used by a location server to inform a UE of the reference cell and neighboring cells, which are related to a cell defined by the information on the reference cell, are provided by information on the neighboring cells. The information on the neighboring cells provides a list of priority of measurement performed by a UE summarized in a descending order. A first cell of the list has a top measurement priority. The UE performs measurement according to the order provided by the location server.

TABLE 4

```
-- ASN1START
PRS-Info ::= SEQUENCE {
    prs-Bandwidth               ENUMERATED { n6, n15, n25, n50, n75, n100, ... },
    prs-ConfigurationIndex INTEGER (0..4095),
    numDL-Frames                ENUMERATED {sf-1, sf-2, sf-4, sf-6, ...},
    ...,
    prs-MutingInfo-r9       CHOICE {
        po2-r9                      BIT STRING (SIZE(2)),
        po4-r9                      BIT STRING (SIZE(4)),
        po8-r9                      BIT STRING (SIZE(8)),
        po16-r9                     BIT STRING (SIZE(16)),
        ...
    }
            OPTIONAL                            -- Need OP
}
-- ASN1STOP
```

In Table 4, the prs-Bandwidth corresponds to a band used for configuring a PRS and the prs-ConfigurationIndex cor- Table 5 in the following shows a neighbor cell information element (OTDOA-NeighbourCellInfoList).

TABLE 5

```
-- ASN1START
OTDOA-NeighbourCellInfoList ::= SEQUENCE (SIZE (1..maxFreqLayers)) OF OTDOA-NeighbourFreqInfo
OTDOA-NeighbourFreqInfo ::= SEQUENCE (SIZE (1..24)) OF OTDOA-NeighbourCellInfoElement
OTDOA-NeighbourCellInfoElement ::= SEQUENCE {
    physCellId                              INTEGER (0..503),
    cellGlobalId                            ECGI
        OPTIONAL,                   -- Need ON
    earfcn                                          ARFCN-ValueEUTRA
        OPTIONAL,                   -- Cond NotSameAsRef0
    cpLength                                        ENUMERATED {normal, extended, ...}
```

TABLE 5-continued

```
        OPTIONAL,                     -- Cond NotSameAsRef1
    prsInfo                                                          PRS-Info
    OPTIONAL,                  -- Cond NotSameAsRef2
        antennaPortConfig                     ENUMERATED {ports-1-or-2, ports-4, ...}
            OPTIONAL,          -- Cond NotSameAsRef3
        slotNumberOffset                      INTEGER (0..19)            OPTIONAL,
        -- Cond NotSameAsRef4
        prs-SubframeOffset                    INTEGER (0..1279) OPTIONAL,
    -- Cond InterFreq
        expectedRSTD                                              INTEGER (0..16383),
        expectedRSTD-Uncertainty   INTEGER (0..1023), ...,
        [[ earfcn-v9a0                        ARFCN-ValueEUTRA-v9a0    OPTIONAL
        -- Cond NotSameAsRef5
        ]]
}
maxFreqLayers    INTEGER ::= 3
-- ASN1STOP
```

In Table 5, the physCellId corresponds to a physical cell ID of a neighbor cell and the cellGloballd corresponds to a unique ID of the neighbor cell in the overall system. The earfcnRef corresponds to EARFCN of the neighbor cell. The cpLength corresponds to a CP length of the neighbor cell PRS. The prsInfo corresponds to a PRS configuration of the reference cell. The antennaPortConfig indicates an antenna port to be used for a cell-specific reference signal among antenna ports 1, 2, and 4. The slotNumberOffset corresponds to a slot number offset between the neighbor cell and the reference cell. The prs-SubframeOffset corresponds to an offset between a first PRS subframe in a reference carrier frequency layer of the reference cell and a first PRS subframe in a different carrier frequency layer of a different cell. The expectedRSTD indicates an RSTD value expected to be measured between the neighbor cell and the reference cell in a target device. The expectedRSTD-Uncertainty indicates uncertainty of the expectedRSTD value.

The UE receives the information on the reference cell and the information on the neighboring cells and reports an RSTD (reference signal time difference), RSTD quality, reference quality, and the like to a base station. The RSTD corresponds to a relative time difference between a neighboring cell j and a reference cell i. The RSTD is defined by a difference between time (TsubfrmaeRxj) at which the UE receives a start of a subframe from the neighboring cell j and time (TsubframeRxi) at which the UE receives a start of a subframe closest to the subframe from the reference cell i.

Table 6 in the following shows OTDOA-SignalMeasurementInformation reported to the base station by the UE.

TABLE 6

```
-- ASN1START
OTDOA-ProvideAssistanceData ::= SEQUENCE {
    otdoa-ReferenceCellInfo      OTDOA-ReferenceCellInfo
    OPTIONAL,       -- Need ON
    otdoa-NeighbourCellInfo      OTDOA-NeighbourCellInfoList
    -- Need ON
    otdoa-Error                            OTDOA-Error
            OPTIONAL,       -- Need ON

...,
}
-- ASN1STOP
```

In Table 6, the systemFrameNumber corresponds to a system frame number on which the last measurement is performed. The physCellIdRef corresponds to a physical cell ID of a related reference cell that provides RSTDs. The cellGlobalIdRef corresponds to a unique ID (ECGI) of the related reference cell that provides RSTDs. The earfcnRef corresponds to E-UTRA carrier frequency of the reference cell used for measuring RSTD. The referenceQuality indicates the best estimation quality of arrival time measurement of a signal received from the reference cell used for calculating RSTD value. The neighborMeasurementList corresponds to a list in which measured RSTD values and measurement quality are included. The physCellIdNeighbor corresponds to physical cell IDs of neighboring cells that provide RSTDs. The cellGlobalIdNeighbor corresponds to a unique ID of neighboring cells that provide RSTDs. The earfcnNeighbor corresponds to E-UTRA carrier frequency of neighboring cells used for measuring RSTD. The rstd corresponds to a relative time difference between a reference cell and a neighboring cell. The rstd-Quality corresponds to the best estimation of a device for measured rstd quality.

As mentioned in the foregoing description, a PRS can be used for performing measurement in OTDOA. In the following, a PRS is explained in detail.

PRS (Positioning Reference Signal)

A PRS is a reference signal used for measuring a location of a UE and is transmitted in resource blocks configured to transmit the PRS only in a downlink subframe. A downlink subframe in which the PRS is transmitted corresponds to a positioning subframe. If both a normal subframe and an MBSFN (multicast-broadcast single frequency network) subframe are configured as the positioning subframe in a cell, OFDM symbols belonging to the MBSFN subframe use a CP (cyclic prefix) identical to a CP used in a subframe #0. If the MBSFN subframe is configured as a positioning subframe only in a cell, an extended CP is used in OFDM symbols configured to transmit a PRS in the MBSFN subframe. A start position of OFDM symbols configured to transmit a PRS in a subframe configured to transmit a PRS is identical to a start position of a subframe having a CP length identical to OFDM symbols configured to transmit a PRS. The PRS is transmitted via an antenna port 6. And, the PRS is not mapped to a resource element to which PBCH, PSS (primary synchronization signal), SSS (secondary synchronization signal), and the like are allocated.

A sequence for the PRS is generated by equation 14 in the following.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 14]}$$

$$m = 0, 1, \ldots, 2N_{RB}^{max,DL} - 1$$

In equation 14, $n_s$ corresponds to a slot number and l indicates an OFDM symbol number in a slot. c(i) corresponds to a pseudo-random sequence and is initialized by equation 15 in the following.

$$c_{init} = \quad \text{[Equation 15]}$$

$$2^{10} \cdot (7 \cdot (n_s + 1) + l + 1) \cdot (2 \cdot N_{ID}^{cell} + 1) + 2 \cdot N_{ID}^{cell} + N_{CP},$$

$$N_{CP} = \begin{cases} 1 & \text{for normal } CP \\ 0 & \text{for extended } CP \end{cases}$$

As shown in FIG. 6, the $r_{l,n_s}(m)$ generated by equation 14 is mapped to a complex number modulation symbol $a_{k,l}^{(p)} = r_{l,n_s}(m')$, which is used as a reference signal for an antenna port 6, by equation 16.

for normal CP↓ [Equation 16]

$$k = $$

$$6(m + N_{RB}^{DL} - N_{RB}^{PRS}) + (6 - l + v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and} \\ & (1 \text{ or } 2 \text{ PBCH antenna ports}) \\ 2, 3, 5, 6 & \text{if } n_s \bmod 2 = 1 \text{ and} \\ & (4 \text{ PBCH antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

for extended CP ↓

$$k = $$

$$6(m + N_{RB}^{DL} - N_{RB}^{PRS}) + (5 - l + v_{shift}) \bmod 6$$

$$l = \begin{cases} 4, 5 & \text{if } n_s \bmod 2 = 0 \\ 1, 2, 4, 5 & \text{if } n_s \bmod 2 = 1 \text{ and} \\ & (1 \text{ or } 2 \text{ PBCH antenna ports}) \\ 2, 4, 5 & \text{if } n_s \bmod 2 = 1 \text{ and} \\ & (4 \text{ PBCH antenna ports}) \end{cases}$$

$$m = 0, 1, \ldots, 2 \cdot N_{RB}^{PRS} - 1$$

$$m' = m + N_{RB}^{max,DL} - N_{RB}^{PRS}.$$

A cell-specific subframe configuration period $T_{PRS}$ for transmitting a PRS and a cell-specific subframe offset $\Delta_{PRS}$ can be determined by a PRS configuration index $I_{PRS}$ provided via a higher layer signal.

TABLE 7

| PRS configuration Index $I_{PRS}$ | PRS periodicity $T_{PRS}$ (subframes) | PRS subframe offset $\Delta_{PRS}$ (subframes) |
|---|---|---|
| 0-159 | 160 | $I_{PRS}$ |
| 160-479 | 320 | $I_{PRS} - 160$ |
| 480-1119 | 640 | $I_{PRS} - 480$ |
| 1120-2399 | 1280 | $I_{PRS} - 1120$ |
| 2400-4095 | Reserved | |

A PRS is transmitted in configured downlink subframes and is not transmitted in a special subframe. The PRS can be transmitted in $N_{PRS}$ number of contiguous downlink subframes (PRS positioning occasion) and the $N_{PRS}$ is configured by a higher layer signal. Among the $N_{PRS}$ number of contiguous downlink subframes, a first subframe satisfies equation 17 in the following.

$$(10 \times n_f + \lfloor n_s/2 \rfloor - \Delta_{PRS}) \bmod T_{PRS} = 0 \quad \text{[Equation 17]}$$

Figure 12:
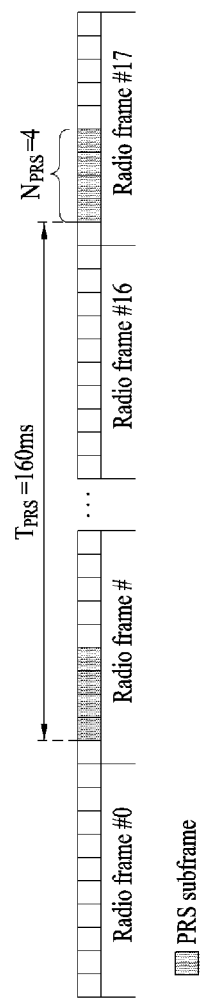

FIG. 12 shows an example of a subframe in which the above-described PRS is transmitted, wherein $N_{PRS}$, which is a PRS positioning occasion, is 4 and $T_{PRS}$ is 160.

Hereinafter, a method of sharing an RSTD (measurement result) between UEs to increase RSTD estimation accuracy will be described. In the following description, a UE, the location of which is estimated, is a target UE (T-UE), a UE helping in estimating the location of the T-UE using RSTD measurement thereof is a helper UE (H-UE), and a UE which is predicted to be located near the T-UE and may be specified as an H-UE through discovery or ranging is a potential helper (PH-UE).

Embodiment 1

Embodiment 1 relates to a method of, at a T-UE, directly receiving RSTD information and RSTD measurement (quality) information of H-UEs from the H-UEs, correcting RSTD information of the T-UE using the received information, and reporting the RSTD measurement information to a network.

Specifically, the UE (T-UE) may receive RSTD measurement information from two or more H-UEs. Using the received RSTD measurement information, the RSTD measurement information measured by the UE may be corrected and the corrected RSTD measurement information may be transmitted to an eNB.

Here, correction of the RSTD measurement information may be linear combination of the RSTD measurement information measured by the UE and the received RSTD measurement information. Alternatively, correction of the RSTD measurement information may be a weighted average of the RSTD measurement information measured by the UE and the received RSTD measurement information. If correction of the measurement information may be performed using only the RSTD quality information of the H-UEs better than the RSTD measurement (quality) of the T-UE (or using only the measurement information of the H-UEs located at a predetermined distance or less). That is, a linear combination or (a weighted average) of RSTD measurements of the H-UEs having good RSTD measurement quality may be used as RSTD measurement of the T-UE. Alternatively, a linear combination of the RSTD measurement of the T-UE and an average of the RSTD measurements of the H-UEs may be used to update the RSTD measurement of the T-UE. Upon obtaining a weighted average of the RSTD measurement information measured by the UE and the received RSTD measurement information, the weighting factor a_i of an i-th H-UE may be calculated by f(RSTD quality_i)/sum(f(RSTD quality_i)). Here, RSTD quality_i denotes the RSTD measurement (quality) of the i-th UE and f may denote a predetermined function. For example, in a square root relation between quality and an RSTD, f(x)=sqrt(x). That is, the weighted factor of the i-th UE may be sqrt(RSTD quality_i)/sum(sqrt(RSTD quality_i)).

In the above description, in association with selection of H-UEs, the H-UEs may be selected by the UE from among PH-UEs discovered in a D2D discovery process. The H-UEs may have received signal strengths equal to or greater than a predetermined level among the PH-UEs discovered in the D2D discovery process. The H-UEs may be located at a predetermined distance or less among the PH-UEs discovered in the D2D discovery process. That is, the T-UE may measure the strengths of signals (or reference signals) of neighboring UEs upon D2D discovery or D2D communication and select UEs having signal strengths equal to or greater than a predetermined threshold or UEs located at a predetermined threshold distance or less as H-UEs through a separate D2D ranging process.

Alternatively, the H-UEs may be selected by a network. Specifically, the H-UES may be selected from PH-UEs by the network based on D2D discovery information reported by the UE. Specifically, when the UE feeds discovery information (e.g., ID information of other UEs which are successfully discovered by the UE) back to the network, the network may signal information regarding which UEs serve as the H-UEs of the T-UE to the T-UE and/or the H-UEs through a physical layer signal or a higher layer signal. Here, the network may set UEs having expected RSTD uncertainty equal to or less than a predetermined threshold among PH-UEs as H-UEs. The network may request RSTD measurement for OTDOA from some or all of PH-UEs or H-UEs and a UE, which has performed RSTD measurement, may not further perform RSTD measurement.

In association with reception of the RSTD measurement information from the H-UEs of the UE, the UE may receive the RSTD measurement information from the H-UEs through a discovery signal. That is, the H-UEs may deliver RSTD measurement and/or RSTD measurement (quality) information to the T-UE using a D2D signal format (e.g., a separate format defined for discovery, communication format or positioning information sharing).

Figure 13:
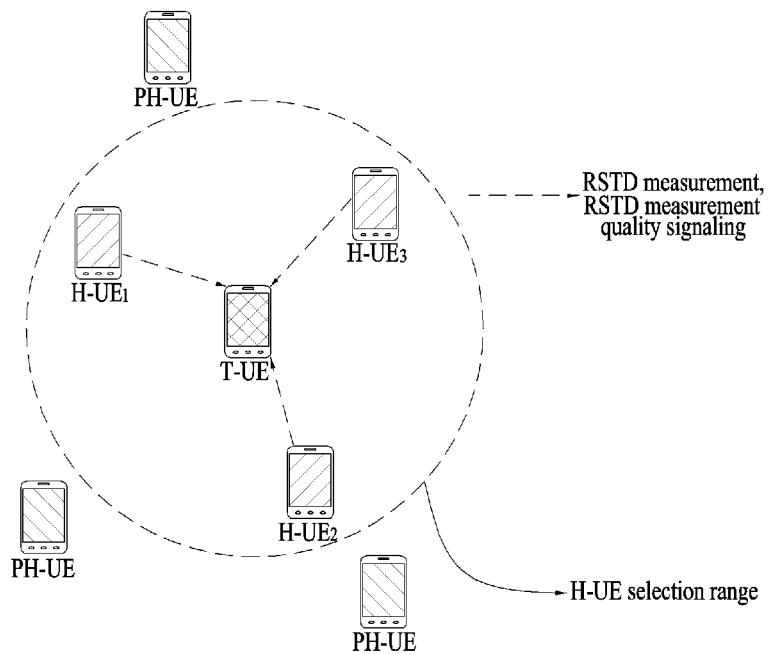
FIGS. 13 to 15 are diagrams illustrating various embodiments of the present invention.

In the description of Embodiment 1, a relation among the T-UE, the H-UEs and the PH-UEs is shown in FIG. 13.

Embodiment 2

In Embodiment 2, a T-UE does not directly receive and correct the RSTD information and the RS ID measurement (quality) information of the H-UEs as in Embodiment 1, but reports a distance with or signal strength information of H-UEs to a network and the network corrects the location of the T-UE using the RSTD information of H-UEs located near a specific UE.

Figure 14:
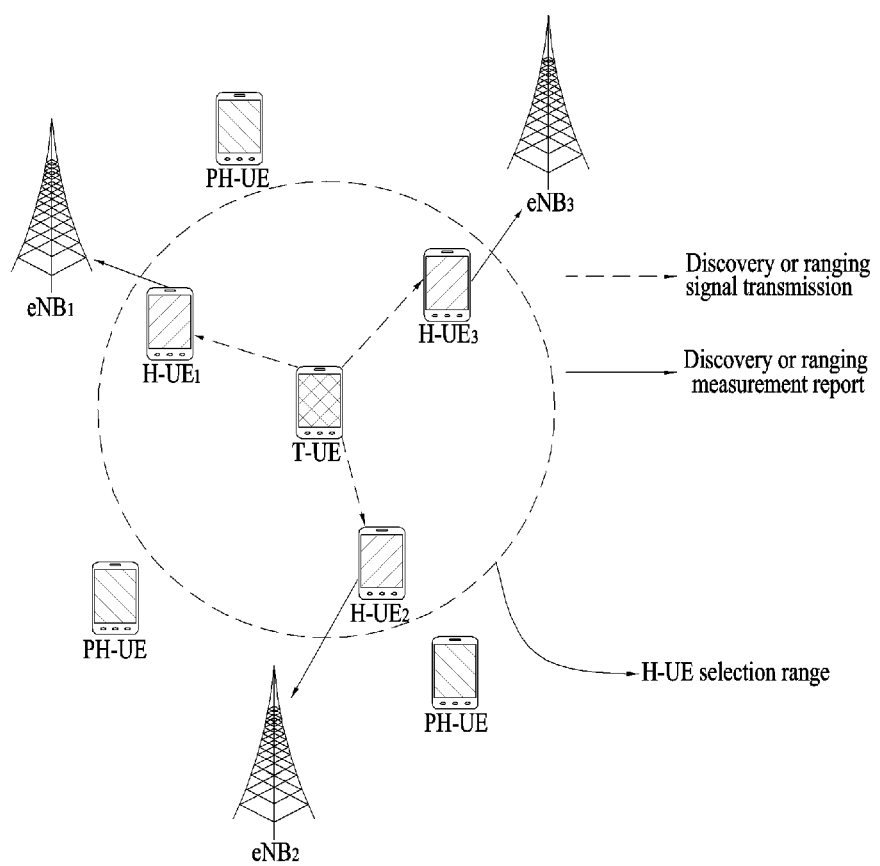

In Embodiment 2, devices may operate as shown in FIG. 14. PH-UEs may receive the signal of the T-UE and measure signal strengths or distances, and PH-UEs located at a predetermined distance or less or having predetermined signal strength or more may be determined to be used to estimate the location information of the T-UE and may serve as H-UEs. The H-UEs may report information indicating that the signal strength information of the T-UE or the signal received from the T-UE exceeds a predetermined threshold to the network. Thereafter, the network may correct the location of the T-UE using the RSTD information of the H-UE located near the specific UE.

Figure 15:
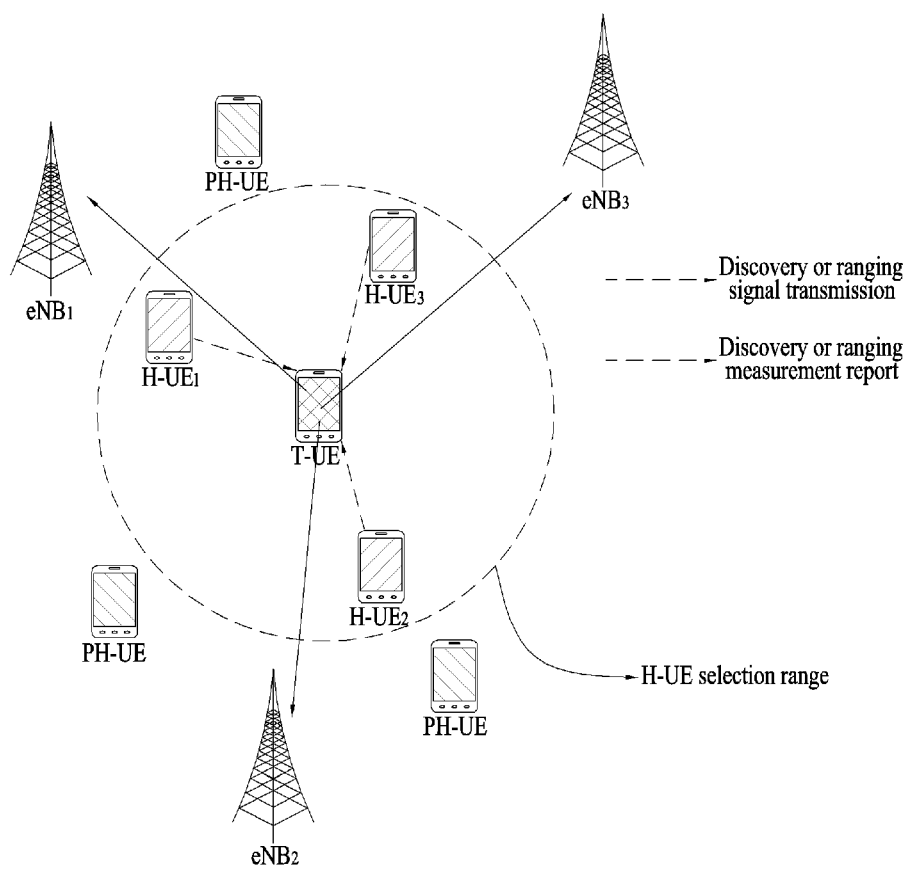

In addition, Embodiment 2 may be implemented as shown in FIG. 15. The T-UE may report UE information (UE IDs and/or discovery signal strengths) of peripheral PH-UEs discovered through a discovery process to the network. Alternatively, the T-UE may feed the ID information and/or signal strength information of the UEs having received signal strengths equal to or greater than a predetermined threshold back to the network and the network may use the RSTD information of the UEs to correct the RSTD of the T-UE.

The network may recognize H-UEs located near the T-UE by feedback of the T-UE or the H-UEs and correct the RSTD measurement value of the T-UE using the RSTD measurement values of the H-UEs located near the T-UE. As a detailed correction method, if the RSTD quality information of the H-UEs is better than the RSTD measurement (quality) of the T-UE, RSTD measurement is corrected using the RSTD measurement result of the H-UE. For example, a linear combination (or a weighted average) of the RSTD measurements of the H-UEs having good RSTD measurement quality may be used as RSTD measurement of the T-UE. Alternatively, a linear combination of the RSTD measurement of the T-UE and an average of the RSTD measurements of the H-UEs may be used to update the RSTD measurement of the T-UE. Upon obtaining a weighted average of the RSTD measurements of the H-UEs, a weighting factor $a\_i$ of an i-th H-UE may be calculated as $f(\text{RSTD quality}\_i)/\text{sum}(f(\text{RSTD quality}\_i))$. Here, RSTD quality_i denotes the RSTD measurement (quality) of the i-th UE and f may denote a predetermined function. For example, in a square root relation between quality and RSTD, $f(x)=\text{sqrt}(x)$. Although only the RSTDs of the H-UEs better than the RSTD measurement (quality) of the T-UE may be used, the RSTD information of the H-UEs determined to be located near the T-UE may be used to correct the RSTD of the T-UE.

In Embodiments 1 and 2, correction of the RSTD measurement information may be performed using only some of the location information of the H-UEs. As a detailed example, correction of the RSTD measurement information may be performed using only vertical location information of the RSTD measurement information from the H-UEs. If horizontal positioning of the T-UE is accurate but vertical positioning thereof is not reliable, vertical information of the H-UE having the largest strength may be taken using the discovery signal of the H-UE or vertical positioning of the T-UE may be performed by a weighted sum of vertical information of the H-UEs of the discovery signals having a predetermined strength or more received from the H-UEs. To this end, the T-UE or H-UE may feed discovery information and/or measurement information (DMRS reception strength of the discovery signal and ID information) of the discovery signal back to the network. In addition, when the H-UEs share the location thereof, only some of the vertical or horizontal information may be included to be directly shared with the T-UE or to be fed back to the eNB (or a location server) through a D2D signal.

Meanwhile, the H-UEs may transmit D2D signals or UL signals and the T-UE may measure the D2D signal or the UL signal to operate an OTDOA. At this time, the transmission time of the H-UE follows a TA value indicated by the eNB. If the TA value indicated by the eNB has resolution of 16 Ts, transmission timing uncertainty is significantly large and OTDOA positioning accuracy is remarkably decreased. Accordingly, in this case, an accurate transmission time of the H-UE needs to be delivered to the T-UE or the network. The H-UE may report a signal indicating an absolute transmission time to the network through a physical layer signal or a higher layer signal or signal an absolute transmission time to the UE using a D2D signal (discovery or communication packets). The absolute time of the H-UE may be represented by 64 bits. In the current UTDOA, an E-SMLC signals an RTOA to an eNB using 64 bits and the eNB receives a signal transmitted by a UL UE based on the absolute time and reports a difference therebetween to the E-SMLC. In this case, the T-UE may compare the signal reception time of the H-UE with the signal transmission time delivered by the H-UE, thereby correcting the RSTD. In addition, when the absolute time is compared with the signal reception time, a distance between the two UEs may be estimated and thus, similarly to an E-CID scheme, positioning for approximating the location of a specific UE to the location of the T-UE based on the distance between the UEs may be performed. Meanwhile, the H-UE may directly deliver the location information thereof to the T-UE to perform OTDOA positioning. This method is advantageous in that the T-UE may check the location thereof even in an RRC idle state without reporting information to the network. The location information of the H-UE may be signaled from the H-UE to the T-UE using a discovery or communication signal.

The examples of the above-proposed methods may be included in one of the implementation methods of the present invention and may be regarded as proposed methods. In addition, the above-proposed methods may be independently implemented and some of the above-proposed methods may be combined (merged). A rule may be defined such that an eNB signals information regarding whether the proposed methods are applied (information regarding the rules of the above-proposed methods) to a UE through a predefined signal (e.g., a physical layer signal or a higher layer signal).

Configuration of Device According to Embodiment of the Present Invention

Figure 16:
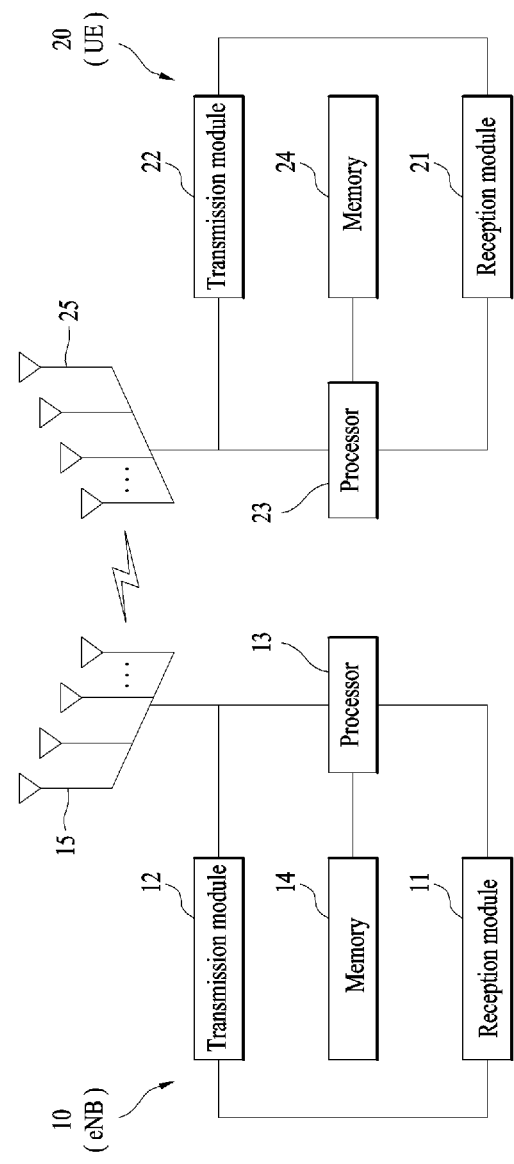
FIG. 16 is a diagram showing the configuration of transmission and reception devices.

FIG. 16 is a diagram showing the configuration of a transmission point device and a UE device.

Referring to FIG. 16, the transmission point device 10 according to the present invention may include a reception module 11, a transmission module 12, a processor 13, a memory 14 and a plurality of antennas 15. Since the plurality of antennas 15 is used, the transmission point device may support MIMO transmission/reception. The reception module 11 may receive a variety of signals, data and information from the UE on uplink. The transmission module 12 may transmit a variety of signals, data and information to the UE on downlink. The processor 13 may control the overall operation of the transmission point device 10.

The processor 13 of the transmission point device 10 according to one embodiment of the present invention may process operations necessary for the above-described embodiments.

The processor 13 of the transmission point device 10 may process information received by the transmission point device 10 and information to be transmitted to an external device and the memory 14 may store the processed information for a predetermined time and may be replaced by a component such as a buffer (not shown).

Referring to FIG. 16, the UE device 20 according to the present invention may include a reception module 21, a transmission module 22, a processor 23, a memory 24 and a plurality of antennas 25. Since the plurality of antennas 25 is used, the UE device may support MIMO transmission/reception. The reception module 25 may receive a variety of signals, data and information from the eNB on downlink. The transmission module 22 may transmit a variety of signals, data and information to the eNB on uplink. The processor 23 may control the overall operation of the UE device 20.

The processor 23 of the UE device 20 according to one embodiment of the present invention may process operations necessary for the above-described embodiments.

The processor 23 of the UE device 20 may process information received by the UE device 20 and information to be transmitted to an external device and the memory 24 may store the processed information for a predetermined time and may be replaced by a component such as a buffer (not shown).

In the above-described detailed configuration of the transmission point device and the UE device, details of the above-described various embodiments of the present invention may be independently applied or 2 or more embodiments may be applied at the same time. In this case, overlapping details will be omitted from the description for simplicity and clarity.

Furthermore, in the description of FIG. 16, the description of the transmission point device 10 may also be equally applied to a device functioning as a downlink transmitter or an uplink receiver. The description of the UE device 20 may also be equally applied to a relay station device functioning as an uplink transmitter or a downlink receiver.

The embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so as to be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Additionally, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

The above-described embodiments of the present invention are applicable to various mobile communication systems.

The invention claimed is:

1. A method of, at a user equipment (UE), correcting a reference signal time difference (RSTD) measurement operation in a wireless communication system, the method comprising:
measuring, by the UE, first RSTD measurement information based on a positioning reference signal (PRS);
receiving second RSTD measurement information measured by H-UEs (helper UEs) from the H-UEs;
correcting the first RSTD measurement information using the received second RSTD measurement information; and
transmitting the corrected first RSTD measurement information to a base station,
wherein the correcting of the first RSTD measurement information is performed using a weighted average of the first RSTD measurement information measured by the UE and the received second RSTD measurement information, and
wherein, upon obtaining the weighted average, a weighted factor of an i-th UE is sqrt(RSTD quality_i)/sum(sqrt (RSTD quality_i)).

2. The method according to claim 1, wherein the correcting of the first RSTD measurement information is performed using only vertical location information of the second RSTD measurement information from the H-UEs.

3. The method according to claim 1, wherein the UE receives the second RSTD measurement information from the H-UEs through a discovery signal.

4. The method according to claim 1, wherein the H-UEs are selected by the UE from among PH-UEs (potential helper UEs) discovered in a device-to-device (D2D) discovery process.

5. The method according to claim 4, wherein the H-UEs have signal strengths equal to or greater than a predetermined level among the PH-UEs discovered in the D2D discovery process.

6. The method according to claim 4, wherein the H-UEs are located at distances of a predetermined value or less among the PH-UEs discovered in the D2D discovery process.

7. The method according to claim 1, wherein the H-UEs are selected by a network from among PH-UEs (potential helper UEs) based on device-to-device (D2D) discovery information reported by the UE.

8. The method according to claim 7, wherein the H-UEs are UEs whose expected RSTD uncertainty is a predetermined value or less among the PH-UEs.

9. A user equipment (UE) device for correcting a reference signal time difference (RSTD) measurement operation in a wireless communication system, the UE device comprising:
a transmission module and a reception module; and
a processor configured to control the transmission module and the reception module,
wherein the processor measures first RSTD measurement information based on a positioning reference signal (PRS), receives second RSTD measurement information measured by H-UEs (helper UEs) from the H-UEs, corrects the first RSTD measurement information using the received second RSTD measurement information, and transmits the corrected first RSTD measurement information to a base station,
wherein the correcting of the first RSTD measurement information is performed using a weighted average of the first RSTD measurement information measured by the UE device and the received second RSTD measurement information, and
wherein, upon obtaining the weighted average, a weighted factor of an i-th UE is sqrt(RSTD quality_i)/sum(sqrt (RSTD quality_i)).

* * * * *